US 12,260,281 B2

United States Patent
Hua et al.

(10) Patent No.: US 12,260,281 B2
(45) Date of Patent: Mar. 25, 2025

(54) READING HEAD PROTECTION APPARATUS AND INFORMATION READING DEVICE

(71) Applicant: CONTEMPORARY AMPEREX TECHNOLOGY (HONG KONG) LIMITED, Hong Kong (CN)

(72) Inventors: Jinjin Hua, Ningde (CN); Haihui Que, Ningde (CN); Lei Song, Ningde (CN); Hongtao Li, Ningde (CN)

(73) Assignee: CONTEMPORARY AMPEREX TECHNOLOGY (HONG KONG) LIMITED, Hong Kong (CN)

( * ) Notice: Subject to any disclaimer, the term of this patent is extended or adjusted under 35 U.S.C. 154(b) by 0 days.

(21) Appl. No.: 18/346,346

(22) Filed: Jul. 3, 2023

(65) Prior Publication Data

US 2024/0232547 A1 Jul. 11, 2024

Related U.S. Application Data (63) Continuation of application No. PCT/CN2023/080778, filed on Mar. 10, 2023.

(30) Foreign Application Priority Data

Jan. 5, 2023 (CN) .......................... 202320024069.2

(51) Int. Cl.
*G06K 7/00* (2006.01)
(52) U.S. Cl.
CPC .................. *G06K 7/0008* (2013.01)
(58) Field of Classification Search
CPC .................................................. G06K 7/0008
(Continued)

(56) References Cited

U.S. PATENT DOCUMENTS 7,872,557 B2  1/2011  Seibert
2014/0299664 A1  10/2014  Ardis
(Continued)

FOREIGN PATENT DOCUMENTS

CN  211761537 U  10/2020
CN  114530728  *  5/2022
(Continued)

OTHER PUBLICATIONS

Extended European Search Report dated Aug. 1, 2024 for Application No. EP 23730345.8.
(Continued)

*Primary Examiner* — Allyson N Trail
(74) *Attorney, Agent, or Firm* — Ladas & Parry LLP (57) ABSTRACT

The disclosure relates to the technical field of information reading devices, and provides a reading head protection apparatus and an information reading device. The reading head protection apparatus includes: a protective jacket including a reading head connection end and a chip connection end connected to the reading head connection end, the reading head connection end being configured to connect to a reading head, and the chip connection end being configured to connect to a chip carrier, wherein a first mounting cavity is arranged in the reading head connection end, a second mounting cavity is arranged in the chip connection end, and the second mounting cavity is communicated with the first mounting cavity. The technical solutions of the present application can achieve stable and reliable adhesion between the reading head and the chip, so as to improve the efficiency of the reading head in reading the stored information in the chip.

10 Claims, 3 Drawing Sheets

(58) Field of Classification Search
USPC .......................................................... 235/435
See application file for complete search history.

(56) References Cited

U.S. PATENT DOCUMENTS

2022/0045532 A1* 2/2022 Onuki .................... H01M 10/44
2024/0145890 A1* 5/2024 Liu ..................... G05B 19/4185

FOREIGN PATENT DOCUMENTS

| CN | 114530728 A | 5/2022 |
| CN | 219349512 U | 7/2023 |
| WO | 2022083640 A1 | 4/2022 |

OTHER PUBLICATIONS

International Search Report dated Jul. 23, 2023 for Application No. PCT/CN2023/080778.

* cited by examiner

READING HEAD PROTECTION APPARATUS AND INFORMATION READING DEVICE

CROSS-REFERENCE TO RELATED APPLICATION

This application is a continuation of International application PCT/CN2023/080778 filed on Mar. 10, 2023 that claims priority to Chinese patent application Ser. No. 202320024069.2 filed on Jan. 5, 2023. The subject matter of both applications is incorporated herein by reference in its entirety.

TECHNICAL FIELD

The present application relates to the technical field of information reading devices, particularly to a reading head protection apparatus and an information reading device.

BACKGROUND ART

This section only provides background information related to the present disclosure and does not necessarily refer to the prior art.

At present, with the rapid development of new energy vehicles, more and more power batteries have entered the public eye.

During the manufacturing process of a power battery, the electrolyte needs to be injected into a battery case. The electrolyte is generally pre-stored in an electrolyte IBC tank, the electrolyte IBC tank is provided with a chip carrier, the chip carrier is configured to fix a chip, data information, such as the formula of the electrolyte, is stored in the chip, and the data information of the electrolyte needs to be read by a reading head and then entered into a system, so as to ensure the traceability of each production link.

In related technologies, when the reading head reads the electrolyte information in the chip, the lack of fixing measures between the reading head and the chip causes that the reading head can not stably adhere to the chip, and the data reading process is unstable, thereby requiring repeated operations to accurately read the electrolyte information in the chip. Moreover, due to the lack of protective measures during the reading process of the reading head, the reading head and the chip may be corroded because of splashing of corrosive liquids, which may affect the service life of the reading head and the chip.

SUMMARY OF THE INVENTION

In view of the above problems, the present application provides a reading head protection apparatus and system to achieve stable and reliable adhesion between the reading head and the chip, so as to improve the efficiency of the reading head in reading the stored information in the chip. At the same time, the reading head and the chip can be prevented from being corroded by corrosive liquids, so as to prolong the service life of the reading head and the chip.

According to the first aspect, the present application provides a reading head protection apparatus, including: a protective jacket including a reading head connection end and a chip connection end connected to the reading head connection end, the reading head connection end being configured to connect to a reading head, and the chip connection end being configured to connect to a chip carrier, wherein a first mounting cavity is arranged in the reading head connection end, a second mounting cavity is arranged in the chip connection end, and the second mounting cavity is communicated with the first mounting cavity.

In the reading head protection apparatus provided according to the first aspect of the present application, the reading head connection end and the chip connection end are arranged on the protective jacket, the reading head connection end is configured to connect to the reading head, the chip connection end is configured to connect to the chip carrier, the reading head connection end and the chip connection end are respectively provided with the first mounting cavity and the second mounting cavity which are communicated with each other, the first mounting cavity is adapted to the reading head, and the second mounting cavity is adapted to the chip carrier in shape. As a result, before the reading head reads the stored information in the chip, the chip carrier may first be mounted in the second mounting cavity, and fixed to the chip connection end, and then, the reading head is mounted in the first mounting cavity, and fixed to the reading head connection end after adhering to the chip on the chip carrier, so that the reading head can stably read the stored information in the chip, so as to improve the efficiency of the reading head in reading the stored information in the chip. Furthermore, when the reading head reads the stored information in the chip, the reading head and the chip are located in the protective jacket, so the protective jacket plays a protective role to prevent corrosive liquids such as electrolyte from dripping and splashing onto the surfaces of the reading head and the chip, thereby improving the safety of the reading head in reading the stored information in the chip, and prolonging the service life of the reading head and the chip.

In addition, the reading head protection apparatus provided according to the present application may also have the following additional technical features:

In some embodiments of the present application, the reading head connection end includes a first connecting sleeve, the first mounting cavity is formed in the first connecting sleeve, and a connecting portion is arranged in the first mounting cavity and configured to connect to the reading head.

The reading head can be inserted into the first mounting cavity in the first connecting sleeve and connected to the connecting portion in the first mounting cavity to fix to the protective jacket, thereby stably reading the stored information in the chip.

In some embodiments of the present application, the connecting portion includes an internal thread configured to threadedly connect to the reading head.

The connecting portion includes an internal thread, it can be understood that the reading head has an external thread, and the external thread of the reading head is threadedly connected to the internal thread of the first connecting sleeve, thereby ensuring the reliability of connection between the reading head and the reading head connection end, preventing the reading head from moving relative to the reading head connection end, and facilitating the detachment of the reading head from the chip connection end after reading the stored information in the chip.

In some embodiments of the present application, the chip connection end includes a second connecting sleeve, the second mounting cavity is formed in the second connecting sleeve and configured to have an interference fit to the chip carrier.

The second mounting cavity is adapted to the chip carrier in size, so that the connection between the chip carrier and the chip connection end can be achieved by interference fit without any additional assembly structure, facilitating the assembly, which prevents the chip carrier from detaching from the second mounting cavity in a free state, and facilitates the detachment between the chip carrier and the chip connection end under an external force.

In some embodiments of the present application, the second connecting sleeve and the first connecting sleeve are coaxially arranged.

The second connecting sleeve and the first connecting sleeve are coaxially arranged, and correspondingly, the second mounting cavity and the first mounting cavity extend along the same axis, so that on the one hand, the overall aesthetics of the product is improved; and on the other hand, after the chip carrier is inserted into the second mounting cavity and the reading head is inserted into the first mounting cavity, the position of the reading head can correspond to the position of the chip, thereby ensuring that the reading head can adhere to the chip.

In some embodiments of the present application, the inner diameter of the second connecting sleeve is greater than the inner diameter of the first connecting sleeve; and a step portion is formed at an end of the second mounting cavity connected to the first mounting cavity, the step portion has a stopper surface configured to abut against the chip carrier.

By arranging the step portion at the end of the second mounting cavity connected to the first mounting cavity, when the chip carrier is inserted into the second mounting cavity, the stopper surface of the step portion can abut against the chip carrier, and stop and limit the chip carrier, to prevent further movement of the chip carrier towards the direction of the first mounting cavity.

In some embodiments of the present application, the reading head protection apparatus further includes a sealing member arranged on the stopper surface, the sealing member is provided with a communication hole allowing the reading head to pass through.

By arranging the sealing member on the stopper surface and arranging the communication hole allowing the reading head to pass through on the sealing member, on the one hand, corrosive liquids can be prevented from entering the first mounting cavity along the inner side wall of the second mounting cavity when the chip carrier is inserted into the second mounting cavity, so as to reduce the corrosion of the reading head; and on the other hand, the reading head can pass through the communication hole to be in contact with the chip, thereby ensuring that the reading head can stably read the stored information in the chip.

In some embodiments of the present application, an anti-corrosion coating is arranged on the surface of the protective jacket.

By arranging the anti-corrosion coating on the surface of the protective jacket, the protective jacket can be prevented from being corroded by corrosive liquids, thereby prolonging the service life of the protective jacket.

According to the second aspect, the present application provides an information reading device, including: a reading head having a reading end; a chip carrier embedded with a chip; and a reading head protection apparatus according to any item in the first aspect, wherein the chip carrier has an interference fit to the second mounting cavity, the reading head is threadedly connected to the first mounting cavity, and the reading end is configured to be in contact connection with the chip.

In the information reading device provided according to the second aspect of the present application, an external thread is arranged on the outer periphery of the reading head and configured to threadedly connect to the internal thread in the first mounting cavity. When the chip carrier is inserted into the second mounting cavity, the chip carrier faces the reading head to ensure that when the reading head is inserted into the first mounting cavity, the reading head can be in contact connection with the chip, so that the reading head can stably read the stored information in the chip.

In some embodiments of the present application, the reading head is further provided with a stopper portion spaced apart from the reading end, an end of the protective jacket of the reading head protection apparatus away from the chip carrier is provided with a position-limit groove, and the stopper portion is configured to be located in the position-limit groove when the end of the reading head is in contact with the chip.

By arranging the position-limit groove at the end of the protective jacket away from the chip carrier, when the reading head is inserted into the first mounting cavity and is in contact connection with the chip, the stopper portion on the reading head can be located in the position-limit groove to limit the insertion depth of the reading head to prevent the damage to the reading head due to stress concentration, thereby further improving the safety of the reading head in use.

DESCRIPTION OF DRAWINGS

Various other advantages and benefits will become apparent to those of ordinary skill in the art upon reading the following detailed description of the preferred embodiments. The drawings are for the purpose of illustrating the preferred embodiments only and are not to be considered a limitation to the present application. Also, the same components are denoted by the same reference numerals throughout the drawings. In the drawings.

DESCRIPTION OF REFERENCE NUMERALS information reading device 1000;
reading head protection apparatus 100, reading head 200, chip carrier 300;
protective jacket 10, sealing member 20;
reading head connection end 11, chip connection end 12, external thread 21, stopper portion 22, chip 31;
first mounting cavity 111, position-limit groove 112, second mounting cavity 121, communication hole 201;
internal thread 1111, stopper surface 1211.

DETAILED DESCRIPTION

Embodiments of the technical solutions of the present application will be described in detail below in conjunction with the drawings. The following embodiments are only used to more clearly illustrate the technical solutions of the present application, and therefore are only used as examples and cannot be used to limit the protection scope of the present application.

Unless otherwise defined, all technical and scientific terms used herein have the same meaning as commonly understood by those skilled in the art belonging to the technical field of the present application. The terms used herein are intended only for the purpose of describing specific embodiments and are not intended to limit the present application. The terms "including" and "having" and any variations thereof in the specification and the claims of the present application and in the description of drawings above are intended to cover non-exclusive inclusion.

In the description of the embodiments of the present application, the technical terms "first", "second", and the like are used only to distinguish between different objects, and are not to be understood as indicating or implying a relative importance or implicitly specifying the number, particular order, or primary and secondary relation of the technical features indicated. In the description of the embodiments of the present application, the meaning of "a plurality of" is two or more, unless otherwise explicitly and specifically defined.

The reference to "embodiments" herein means that specific features, structures or characteristics described in combination with embodiments may be included in at least one embodiment of the present application. The appearance of this phrase in various places in the specification does not necessarily refer to the same embodiment, nor is it a separate or alternative embodiment that is mutually exclusive with other embodiments. It is explicitly and implicitly understood by those skilled in the art that the embodiments described herein may be combined with other embodiments.

In the description of the embodiments of the present application, the term "and/or" is simply a description of an association of associated objects, which indicates that there may exist three relationships, for example, A and/or B may mean: the presence of A, the presence of both A and B, and the presence of B. In addition, the character "/" herein generally means that the associated objects before and after it are in an "or" relationship.

In the description of the embodiments of the present application, the term "a plurality of" refers to two or more (including two), and similarly, "multiple groups" refers to two or more (including two) groups, and "multiple sheets" refers to two or more (including two) sheets.

In the description of the embodiments of the present application, the orientation or position relationships indicated by technical terms such as "center", "longitudinal", "transverse", "length", "width", "thickness", "upper", "lower", "front", "back", "left", "right", "vertical", "horizontal", "top", "bottom", "inside", "outside", "clockwise", "counterclockwise", "axial", "radial", "circumferential", and the like are orientation or position relationships shown based on the drawings. These terms are only for the convenience of describing the embodiments of the present application and simplifying the description, but do not indicate or imply that the specified apparatus or component needs to have a specific orientation and needs to be constructed and operated in the specific orientation, so that it can not be understood as a limitation to the embodiments of the present application.

In the description of the embodiments of the present application, unless otherwise clearly specified and defined, the technical terms "mounting", "connected", "connection", "fixing", and the like should be understood in a broad sense. For example, the "connection" may be fixed connection, detachable connection or integrated connection, may be mechanical connection or electrical connection, or may be direct connection, indirect connection through an intermediate, internal communication of two components, or interaction between two components. For those of ordinary skill in the art, the specific meanings of the above terms in the embodiments of the present application can be understood according to specific situations.

At present, with the rapid development of new energy vehicles, more and more power batteries have entered the public eye.

During the manufacturing process of a power battery, the electrolyte needs to be injected into a battery case. The electrolyte is generally pre-stored in an electrolyte IBC tank, the electrolyte IBC tank is provided with a chip carrier, the chip carrier is embedded with a chip, data information, such as the formula of the electrolyte, is stored in the chip, and the data information of the electrolyte needs to be read by a reading head and then entered into a system, so as to ensure the traceability of each production link.

When the reading head reads the electrolyte information in the chip, the lack of fixing measures between the reading head and the chip causes that the reading head can not stably adhere to the chip, and the data reading process is unstable, thereby requiring repeated operations to accurately read the electrolyte information in the chip, resulting in lower reading efficiency. Moreover, due to the lack of protective measures for the reading head during the reading process, after the electrolyte is injected from the electrolyte IBC tank into the battery case through a liquid injection tube, the residual electrolyte in the liquid injection tube will inevitably drip onto the chip carrier and the reading head, leading to corrosion of the reading head and the chip, thereby affecting the service life of the reading head and the chip.

In order to avoid the conditions that a reading head cannot stably and reliably read the electrolyte information in a chip and the reading head and the chip may be corroded due to electrolyte splashing during the reading process of the reading head, the present application designs a reading head protection apparatus which uses a reading head connection end and a chip connection end of a protective jacket to respectively connect to the reading head and the chip, and then, the reading head and the chip are in contact connection in a first mounting cavity and a second mounting cavity of the protective jacket, so as to ensure the stability and reliability of the reading head and the chip in contact, thereby improving the stability and reliability of the reading head in reading the electrolyte information in the chip, preventing corrosion caused by contact between the reading head and chip and the electrolyte, and effectively prolonging the service life of the reading head and the chip.

The reading head protection apparatus disclosed in the embodiments of the present application includes, but is not limited to, a reading head for reading the electrolyte information in the chip on an electrolyte IBC tank.

Figure 1:
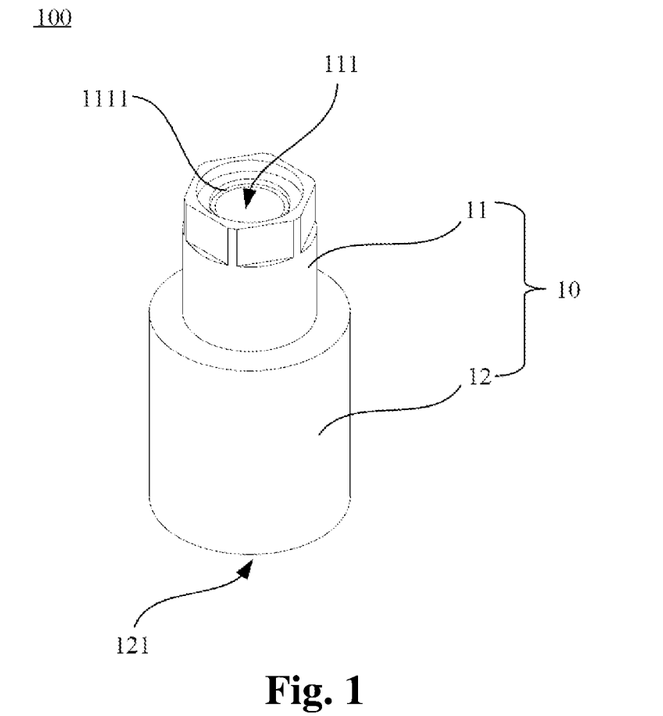
FIG. 1 is a schematic structural view of a reading head protection apparatus provided in some embodiments of the present application from one perspective.
Figure 2:
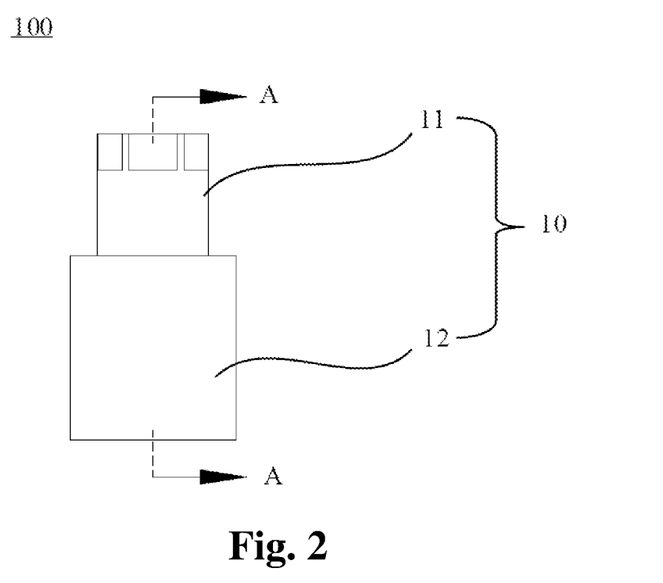
FIG. 2 is a schematic structural view of a reading head protection apparatus provided in some embodiments of the present application from another perspective.
Figure 3:
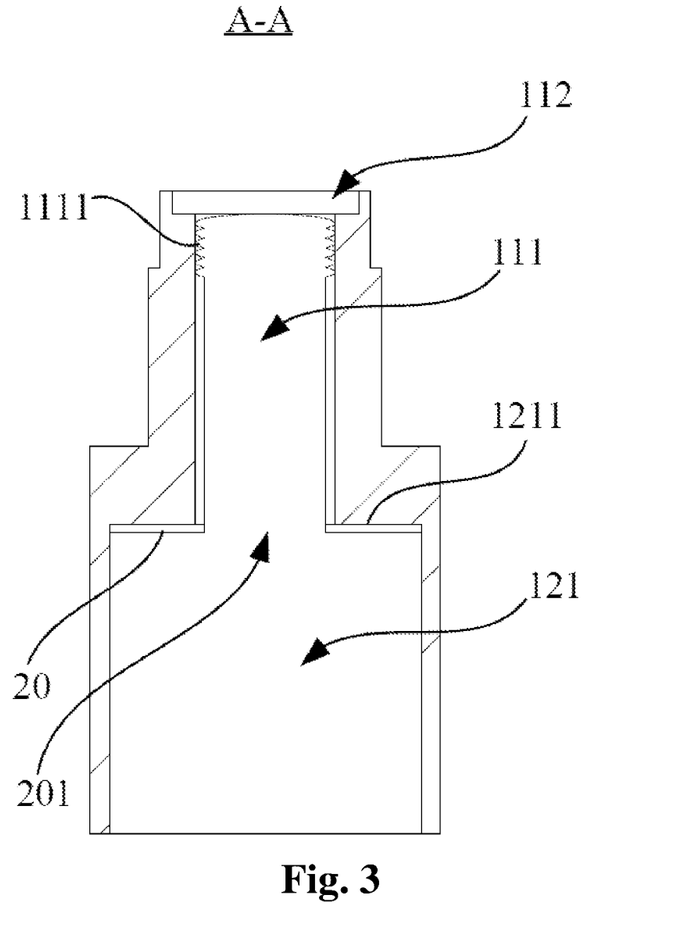
FIG. 3 is a schematic cross-sectional structural view taken along line A-A in FIG. 2.

Referring to FIG. 1 to FIG. 3, FIG. 1 is a schematic structural view of a reading head protection apparatus provided in some embodiments of the present application from one perspective; FIG. 2 is a schematic structural view of a reading head protection apparatus provided in some embodiments of the present application from another perspective; and FIG. 3 is a schematic cross-sectional structural view taken along line A-A in FIG. 2. According to some embodiments of the present application, the first aspect of the present application provides a protection apparatus 100 of a reading head 200. The protection apparatus 100 of the reading head 200 includes a protective jacket 10, and the protective jacket 10 includes a reading head connection end 11 and a chip connection end 12 connected to the reading head connection end 11, wherein the reading head connection end 11 is configured to connect to the reading head 200, the chip connection end 12 is configured to connect to a chip carrier 300, a first mounting cavity 111 is arranged in the reading head connection end 11, a second mounting cavity 121 is arranged in the chip connection end 12, and the second mounting cavity 121 is communicated with the first mounting cavity 111.

After the reading head connection end 11 is connected to the reading head 200, there will be no relative movement between the reading head 200 and the protective jacket 10 in a free state; and after the chip connection end 12 is connected to the chip carrier 300, there will be no relative movement between the chip carrier 300 and the protective jacket 10 in a free state.

As a example, cross sections of the first mounting cavity 111 and the second mounting cavity 121 are both circular, the first mounting cavity 111 is configured to at least accommodate the reading end of the reading head 200, and the second mounting cavity 121 is configured to at least accommodate an end of the chip carrier 300 provided with a chip 31.

The reading head connection end 11 and the chip connection end 12 are arranged on the protective jacket 10, and the reading head connection end 11 and the chip connection end 12 are respectively provided with the first mounting cavity 111 and the second mounting cavity 121 which are communicated with each other. As a result, before the reading head 200 reads the stored information in the chip 31, first, the chip carrier 300 may be mounted in the second mounting cavity 121, and the chip carrier 300 is fixed to the chip connection end 12; and then, the reading head 200 is connected to the reading head connection end 11, and the reading end of the reading head 200 adheres to the chip 31 on the chip carrier 300 in the second mounting cavity 121 through the first mounting cavity 111, so that the reading head 200 can stably read the stored information in the chip 31, so as to improve the efficiency of the reading head 200 in reading the stored information in the chip 31. Furthermore, when the reading head 200 reads the stored information in the chip 31, the reading head 200 and the chip 31 are located in the protective jacket 10, so the protective jacket 10 plays a protective role to prevent corrosive liquids such as electrolyte from dripping and splashing onto the surfaces of the reading head 200 and the chip 31, thereby improving the safety of the reading head 200 in reading the stored information in the chip 31, and prolonging the service life of the reading head 200 and the chip 31.

Referring to FIG. 2 and FIG. 3, according to some embodiments of the present application, the reading head connection end 11 includes a first connecting sleeve, the first mounting cavity 111 is formed in the first connecting sleeve, and a connecting portion configured to connect to the reading head 200 is arranged in the first mounting cavity 111.

As a example, an external thread 21 is arranged on the outer periphery of the reading head 200, and at this time, the connecting portion is an internal thread 1111; or an elastic bulge may be arranged on the outer periphery of the reading head 200, and at this time, the connecting portion is a clamping groove.

When the reading head 200 is inserted into the first mounting cavity 111 in the first connecting sleeve and connected to the connecting portion in the first mounting cavity 111, the fixation between the reading head 200 and the protective jacket 10 can be achieved, thereby stably reading the stored information in the chip 31.

Referring to FIG. 1 and FIG. 3, according to some embodiments of the present application, the connecting portion includes an internal thread 1111 configured to threadedly connect to the reading head 200.

It can be understood that the external thread 21 is arranged on the outer periphery of the reading head 200, at this time, the connecting portion is the internal thread 1111, and the external thread 21 of the reading head 200 is threadedly connected to the internal thread 1111 of the first connecting sleeve, thereby ensuring the reliability of connection between the reading head 200 and the reading head connection end 11, preventing the reading head 200 from moving relative to the reading head connection end 11, and facilitating the detachment of the reading head 200 from the chip connection end 12 after reading the stored information in the chip 31.

According to some embodiments of the present application, the chip connection end 12 includes a second connecting sleeve, the second mounting cavity 121 is formed in the second connecting sleeve, and the second mounting cavity 121 is configured to have an interference fit to the chip carrier 300.

The interference fit refers to the connection achieved by making the fit between parts have an interference effect.

The second mounting cavity 121 has an interference fit to the chip carrier 300, an assembly structure is not needed, the assembly is convenient, the chip carrier 300 can be prevented from detaching from the second mounting cavity 121 in a free state, and the chip carrier 300 and the chip connection end 12 can be detached conveniently under the action of an external force. Of course, an internal thread may be arranged in the second connecting sleeve, and an external thread may be arranged on the outer periphery of the chip carrier 300, so that the chip carrier 300 is threadedly connected to the second connecting sleeve.

Referring to FIG. 2 and FIG. 3, according to some embodiments of the present application, the second connecting sleeve and the first connecting sleeve are coaxially arranged.

The first connecting sleeve and the second connecting sleeve are barrel-shaped and are arranged along the same axis, and correspondingly, the second mounting cavity 121 and the first mounting cavity 111 extend along the same axis.

By adopting the above arrangement mode, on the one hand, the overall product is relatively regular, thereby improving the overall aesthetics of the product; and on the other hand, after the chip carrier 300 is inserted into the second mounting cavity 121 and the reading head 200 is inserted into the first mounting cavity 111, the position of the reading head 200 can correspond to the position of the chip 31, thereby ensuring that the reading head 200 can adhere to the chip 31.

Referring to FIG. 2 and FIG. 3, according to some embodiments of the present application, the inner diameter of the second connecting sleeve is greater than the inner diameter of the first connecting sleeve; and a step portion is formed at an end of the second mounting cavity 121 connected to the first mounting cavity 111, the step portion has a stopper surface 1211, and the stopper surface 1211 is configured to abut against the chip carrier 300.

The inner diameter of the first connecting sleeve is greater than the inner diameter of the second connecting sleeve, that is, the diameter of the first mounting cavity 111 is greater than the diameter of the second mounting cavity 121.

When the chip carrier 300 is inserted into the second mounting cavity 121 and the stopper surface 1211 of the step portion abuts against the chip carrier 300, the stopper surface 1211 can play a stop limit role to prevent further movement of the chip carrier 300 along the second mounting cavity 121.

Referring to FIG. 3, according to some embodiments of the present application, the protection apparatus 100 of the reading head 200 further includes a sealing member 20 arranged on the stopper surface 1211, and the sealing member 20 is provided with a communication hole 201 allowing the reading head 200 to pass through.

As a example, the sealing member 20 is a rubber pad or a silicone pad, and the rubber pad or the silicone pad has elasticity to achieve elastic deformation under the squeezing action of the chip carrier 300, thereby playing a sealing role to prevent the electrolyte from entering the first mounting cavity 111 along the inner wall of the second mounting cavity 121.

By arranging the sealing member 20 on the stopper surface 1211, on the one hand, corrosive liquids such as electrolyte can be prevented from entering the first mounting cavity 111 along the inner side wall of the second mounting cavity 121 when the chip carrier 300 is inserted into the second mounting cavity 121, so as to reduce the corrosion of the reading head 200; and on the other hand, the reading head 200 can pass through the communication hole 201 to be in contact with the chip 31, thereby ensuring that the reading head 200 can stably read the stored information in the chip 31.

According to some embodiments of the present application, an anti-corrosion coating is arranged on the surface of the protective jacket 10.

The anti-corrosion coating refers to a covering layer coated on the surface of the protective jacket 10 to isolate the protective jacket 10 from surrounding media to prevent corrosion of the protective jacket 10. The surface of the protective jacket 10 includes an inner surface and an outer surface of the protective jacket 10.

By arranging the anti-corrosion coating on the surface of the protective jacket 10, the protective jacket 10 can be prevented from being corroded by corrosive media, thereby prolonging the service life of the protective jacket 10.

Referring to FIG. 1 to FIG. 3, according to some embodiments of the present application, the present application provides a protection apparatus 100 of a reading head 200. The protection apparatus 100 of the reading head 200 includes a protective jacket 10 and a sealing member 20. The protective jacket 10 includes a first connecting sleeve and a second connecting sleeve coaxial with the first connecting sleeve. A first mounting cavity 111 is arranged in the first connecting sleeve, and a second mounting cavity 121 communicated with the first mounting cavity 111 is arranged in the second connecting sleeve. An internal thread 1111 is arranged in the first mounting cavity 111, and the internal thread 1111 is configured to threadedly connect to the reading head 200. The second mounting cavity 121 is configured to have an interference fit to the chip carrier 300, and a step portion is formed at an end of the second mounting cavity 121 connected to the first mounting cavity 111. The step portion has a stopper surface 1211 configured to abut against the chip carrier 300. The sealing member 20 is arranged on the stopper surface 1211 to prevent corrosive liquids such as the electrolyte from entering the first mounting cavity 111 along the wall surface of the second mounting cavity 121. In this way, after the chip 31 has an interference fit to the second mounting cavity 121, when the reading end of the reading head 200 is inserted into the first mounting cavity 111 and is in contact connection with the chip 31, the reading head 200 is threadedly connected to the internal thread 1111 in the first mounting cavity 111, thereby stably reading the stored information in the chip 31. At the same time, since the reading head 200 and the chip 31 are located in the protective jacket 10, the protective jacket 10 can play a protective role to prevent the reading head 200 and the chip 31 from being corroded by corrosive liquids such as the electrolyte, thereby prolonging the service life of the reading head 200 and the chip 31.

Figure 4:
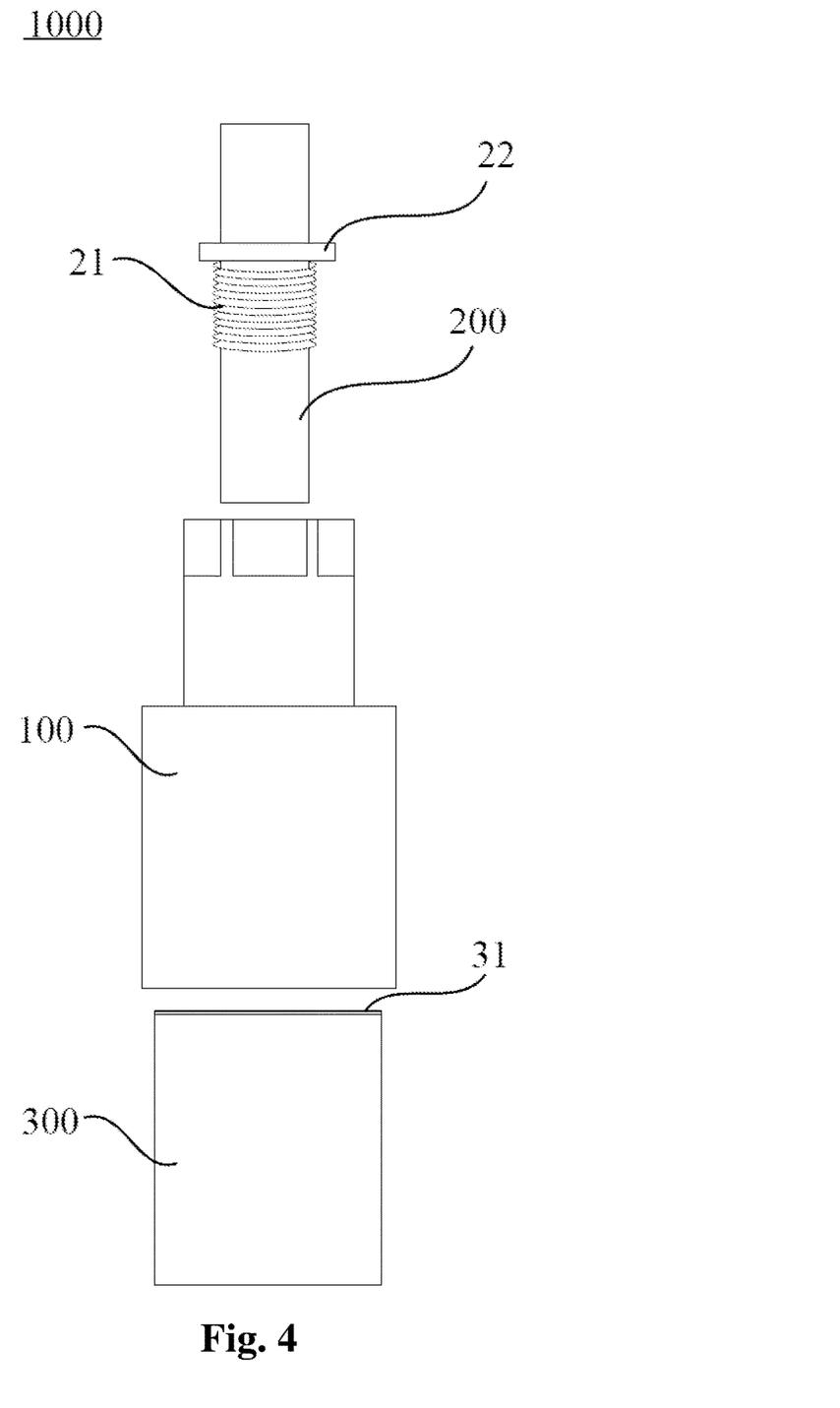
FIG. 4 is a schematic exploded structural view of an information reading device provided in some embodiments of the present application.

Referring to FIG. 4, according to some embodiments of the present application, the second aspect of the present application provides an information reading device 1000, including a reading head 200, a chip carrier 300 and a protection apparatus 100 of a reading head 200 according to any item in the first aspect, wherein the reading head 200 has a reading end, and the reading end is configured to be in contact connection with the chip 31; the chip carrier 300 is embedded with the chip 31; and the chip carrier 300 has an interference fit to the second mounting cavity 121, and the reading head 200 is threadedly connected to the first mounting cavity 111.

In the information reading device 1000 provided according to the second aspect of the present application, an external thread 21 is arranged on the outer periphery of the reading head 200, and the external thread 21 is configured to threadedly connect to the internal thread 1111 in the first mounting cavity 111. When the chip carrier 300 is inserted into the second mounting cavity 121, the chip carrier 300 faces the reading head 200 to ensure that when the reading head 200 is inserted into the first mounting cavity 111, the reading head 200 can be in contact connection with the chip 31, so that the reading head 200 can stably read the stored information in the chip 31.

According to some embodiments of the present application, the reading head 200 is further provided with a stopper portion 22 spaced apart from the reading end, an end of the protective jacket 10 of the protection apparatus 100 of the reading head 200 away from the chip carrier 300 is provided with a position-limit groove 112, and the stopper portion 22 is configured to be located in the position-limit groove 112 when the end of the reading head 200 is in contact with the chip 31.

As a example, position-limit groove 112 is a circular groove, and the stopper portion 22 is an annular protrusion that partially protrudes from the periphery of the end of the reading head 200 away from the chip carrier 300 in the direction away from axis of the reading head 200.

By arranging the position-limit groove 112 at the end of the protective jacket 10 away from the chip carrier 300, when the reading head 200 is inserted into the first mounting cavity 111 and is in contact connection with the chip 31, the stopper portion 22 on the reading head 200 can be located in the position-limit groove 112 to limit the insertion depth of the reading head 200 to prevent the damage to the reading head 200 due to stress concentration, thereby further improving the safety of the reading head 200 in use.

The above descriptions are only preferred specific embodiments of the present application, but the protection scope of the present application is not limited thereto. Any variation or replacement readily figured out by a person skilled in the art within the technical scope disclosed in the present application shall fall within the protection scope of the present application. Therefore, the protection scope of the present application shall be determined with reference to the protection scope of the claims.

Finally, it should be noted that the above embodiments are merely used for illustrating rather than limiting the technical solutions of the present application. Although the present application has been described in detail with reference to the above embodiments, those of ordinary skill in the art should understand that the technical solutions specified in the above embodiments can still be modified, or some or all of the technical features therein can be equivalently substituted. Such modifications or substitutions do not make the essence of the corresponding technical solutions depart from the scope of the technical solutions of the embodiments of the present application, and shall fall within the scope of the claims and the specification of the present application. In particular, the technical features mentioned in the embodiments can be combined in any manner as long as there is no structural conflict. The present application is not limited to the specific embodiments disclosed herein, but rather includes all technical solutions falling within the scope of the claims.

The invention claimed is:

1. A reading head protection apparatus, comprising:
a protective jacket comprising a reading head connection end and a chip connection end connected to the reading head connection end, the reading head connection end being configured to connect to a reading head, and the chip connection end being configured to connect to a chip carrier,
wherein a first mounting cavity is arranged in the reading head connection end, a second mounting cavity is arranged in the chip connection end, and the second mounting cavity is communicated with the first mounting cavity.

2. The reading head protection apparatus according to claim 1, wherein the reading head connection end comprises a first connecting sleeve, the first mounting cavity is formed in the first connecting sleeve, and a connecting portion is arranged in the first mounting cavity and configured to connect to the reading head.

3. The reading head protection apparatus according to claim 2, wherein the connecting portion comprises an internal thread configured to threadedly connect to the reading head.

4. The reading head protection apparatus according to claim 1, wherein the chip connection end comprises a second connecting sleeve, the second mounting cavity is formed in the second connecting sleeve and configured to have an interference fit to the chip carrier.

5. The reading head protection apparatus according to claim 4, wherein the second connecting sleeve and the first connecting sleeve are coaxially arranged.

6. The reading head protection apparatus according to claim 4, wherein an inner diameter of the second connecting sleeve is greater than an inner diameter of the first connecting sleeve; and
a step portion is formed at an end of the second mounting cavity connected to the first mounting cavity, the step portion has a stopper surface configured to abut against the chip carrier.

7. The reading head protection apparatus according to claim 6, further comprising a sealing member arranged on the stopper surface, the sealing member is provided with a communication hole allowing the reading head to pass through.

8. The reading head protection apparatus according to claim 1, wherein an anti-corrosion coating is arranged on a surface of the protective jacket.

9. An information reading device, comprising:
a reading head protection apparatus according to claim 1;
the reading head having a reading end;
a chip carrier embedded with a chip;
wherein the chip carrier has an interference fit to the second mounting cavity, the reading head is threadedly connected to the first mounting cavity, and the reading end is configured to be in contact connection with the chip.

10. The information reading device according to claim 9, wherein the reading head is further provided with a stopper portion spaced apart from the reading end, an end of the protective jacket away from the chip carrier is provided with a position-limit groove, and the stopper portion is configured to be located in the position-limit groove when the end of the reading head is in contact with the chip.

* * * * *